Patented Dec. 1, 1931

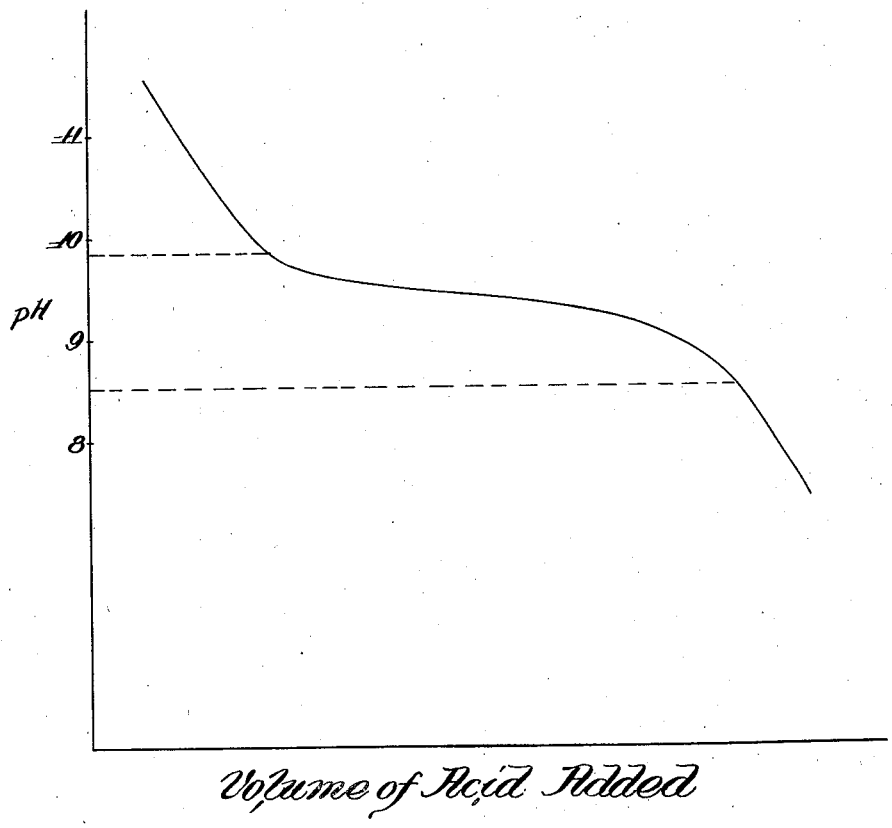

1,834,481

UNITED STATES PATENT OFFICE

FREDERICK W. VOGEL, PAUL BROWN, AND ROGER B. HILL, OF BERLIN, NEW HAMPSHIRE, ASSIGNORS TO BROWN COMPANY, OF BERLIN, NEW HAMPSHIRE, A CORPORATION OF MAINE

CONDITIONING OF LATEX AND CONDITIONED PRODUCT

Application filed July 19, 1929. Serial No. 379,464.

This invention relates to the conditioning of rubber latex for use as a raw material more particularly in the impregnation of porous foundations more especially of a fibrous character, to impart water resistance and other desirable characteristics thereto. An object of such conditioning is to effect an improvement in characteristics of the dried, latex-impregnated product, including the important desideratum of uniformity of rubber distribution through the product.

Latex is now being used extensively in the impregnation of porous foundations, for instance, fibrous material in the form of yarns or cords, textile fabrics, and interfelted webs, the water of the latex serving to carry the dispersed rubber particles into and through the foundation, so that upon drying the rubber sets or coagulates in situ to impart the desired characteristics, including water resistance, to the product. The use of latex in lieu of "rubber solutions" or rubber cements is advantageous not only because it is possible to effect rapid and uniform impregnation and to produce a final product of comparatively high rubber content, but because the fire hazard incident to the highly inflammable organic solvents used in rubber cements is done away with. The latex of commerce, whether in natural or concentrated condition, contains an alkali such as ammonia, caustic soda, or caustic potash, which serves to keep it from undergoing putrefaction and coagulation during transit and storage. The alkali evidently converts certain unstable, non-rubber constituents present in the latex to stable reaction products.

A natural latex having a solids content of about 35% may contain from 3% to 10% non-rubber solids in the form of resins, proteins, sugars, and mineral salts. The dispersed particles of latex are supposed to consist of rubber-hydrocarbon cores enveloped by protein coatings which serve to coat the particles in dispersed condition. These coatings are evidently ruptured by decomposition on aging of the latex, unless some agent which acts as a preservative is added to the latex. The addition of an alkali such as ammonia quite likely effects a conversion of the protein constituent to stable ammonium proteinates, which serve as protective colloids in ammoni-preserved latex. So, too, it is likely that the ammonia reacts with the resin content of the latex to produce stable ammonium resinates which serve as protective colloids in the latex. When such alkali-preserved latex is used for the impregnation of porous foundations, it is found that setting or coagulation of the rubber in the foundation is slow, because of the high stability accorded by the protective colloids present in the latex. It has further been found that during drying the rubber particles tend to migrate to the surface, where evaporation is taking place. The migration of rubber particles is especially serious when a porous web composed of loosely felted cellulose fibers and intended for use as a foundation for the production of an artificial leather is impregnated with latex and is then dried. In such case, because of the high capillary action during drying, a marked migration of rubber particles takes place, and the resulting dried, latex-impregnated web has poor "ply adhesion" or tenacity of bond between the face portions or layers. We have found that if the alkalinity or pH value of an alkali-preserved latex is reduced as by the addition of an acidic reagent thereto, to a region of alkalinity somewhat above the point of neutrality, the rate of setting or coagulation of the latex when used for impregnating purposes is increased, and accordingly migration of rubber particles in the latex-impregnated foundation is decreased to a surprising degree. This reduction in alkalinity may be effected without apparent coagulation of the latex. It appears unnecessary to carry this reduction below a pH value of about 8.5 to 9, as it has been observed that when an acidic reagent is gradually added to the latex, the pH value progressively drops to about 9.7, whereupon a further reduction in alkalinity consumes more acidic reagent than is theoretically necessary for reaction with the alkali alone, this holding true until a pH value of about as low as 8.5 is reached, whereupon reduction in alkalinity proceeds as is theoretically expected would result from the reaction of the acidic reagent with alkali alone. The point 8.5 is not sharply critical, the accompanying drawing illustrating the relation of pH to volume of acidic reagent added to an alkali-preserved latex. The shape of this curve depends somewhat upon the nature of the acidic reagent, for instance, upon whether it is a strong or weak acid and whether it is monobasic or polybasic. Evidently the first portions of acidic reagent selectively react or combine with the free alkali present in the latex, but when the pH value has been reduced to about 9.7, the acidic reagent probably reacts both with the free alkali and the alkali proteinates and resinates, decomposing these protective colloids and converting them into non-protective reaction products, this decomposition evidently being substantially completed at a pH value of about 8.5. Inasmuch as the destruction of protective colloid apparently ceases at a pH value of about 8.5, it is unnecessary to go below this value, this being confirmed by the fact that the addition of more acid apparently does not effect a further improvement in setting characteristics or greater uniformity of a product impregnated with the latex. By terminating the acid treatment in a region of alkalinity safely above neutral, agglomeration or coagulation of the rubber particles is avoided, the resulting latex being of the desired fine particle size and penetrating rapidly and uniformly into porous foundations. It has been observed that if the resulting latex is restored to its original alkalinity or pH value, the beneficial effects obtained by previous treatment with acidic reagent are unimpaired, indicating that the protective colloids originally associated with the latex have been permanently or irreversibly changed in their effect. Accordingly, after the acid treatment, the latex may be treated with additional alkali to increase its alkalinity, for instance until its original pH value is restored. It is quite desirable to add the additional alkali in order that the latex shall not be too sensitive to agitation or simply to standing, as at a pH value of 8.5 it is likely to form noticeable curds of coagulated rubber upon standing over night.

Various acidic reagents may be used to reduce the alkalinity of an alkali-preserved latex, for instance, inorganic acids such as hydrochloric, sulphuric, and phosphoric, acid salts or salts which hydrolyze to give acid reactions, such as sodium acid sulphate, sodium acid phosphate, and various alums, and organic acids such as lactic, tartaric, citric, formic, and acetic. Inasmuch as concentrated solutions of highly ionized acids tend to cause local coagulation or at least agglomeration when added to latex, it is preferable to use dilute solutions, say, from 2% to 10% concentration, and to add slowly to the latex with constant stirring. Such dilute solutions lower the solids content of the latex, but, assuming that one starts with an ammonia-preserved latex having a pH value of about 11 and adds a 2% acetic solution, until the pH value has been reduced to 9.0, the resulting latex will be of about 20% solids content, at which content, or even lower, impregnation of porous foundations is usually carried out.

When a porous web of interfelted fiber is impregnated with the resulting latex, as by dipping thereinto, and the web dried and, if desired, vulcanized, it acquires leather-like characteristics, including strength, resistance to tear, water repellency, feel, and the like. The degree to which these properties are acquired by the product depends upon a variety of factors, but it is possible, particularly when using a porous web of cellulose fibers such as rag or wood pulp, loosely interfelted on machinery of the papermaking type, to produce artificial leathers as described, with properties closely simulating those of the natural product, especially when latex treated as hereinbefore described is used for impregnation.

When a porous web of loosely interfelted cellulose fiber is dipped into the usual alkali-preserved latex diluted to about 15% solids content, and then dried, it has poor ply adhesion. Latex treated as hereinbefore described, however, when used for such purpose, gives a product of excellent ply adhesion. The greatly improved ply adhesion is attributable to the greater uniformity of rubber distribution through the dried product, which, in turn, is made possible by destroying the protective action of the protective colloids in the latex, so that the rubber particles coalesce quickly during the drying of the web and do not tend to migrate to the surface. In other words, if considerable migration to the surface of the web takes place during the drying operation, the center of the sheet is left relatively poorer in rubber and the sheet may easily be split apart. When the dried, latex-impregnated web contains 40% to 50%, or even more rubber, it is still porous, has marked resiliency, and is admirably adapted for use in the manufacture of inner soles where porosity in addition to other leather-like qualities is desired. It is also well adapted to such uses as, for instance, shoe linings, book binding, etc. When the dried, latex-impregnated web is used in the manufacture of inner soles, it is preferable to use non-volatile acid, such as lactic, tartaric, or citric acid, for the treatment of the alkali-preserved latex, as there is no danger of acid vapors being generated during the use of the shoes in which the soles are used, and thus give rise to the danger of injuring or discomforting the feet.

We claim:

1. A step which comprises reducing the alkalinity of an alkali-preserved latex with an acidic reagent to a pH value of about 8.5 to 9.5.

2. Steps which comprise reducing the alkalinity of an alkali-preserved latex with an acidic reagent without coagulating the rubber, and then increasing its alkalinity.

3. Steps which comprise reducing the alkalinity of an alkali-preserved latex with an acidic reagent without coagulating the rubber, and then restoring its original alkalinity.

4. Steps which comprise adding a dilute acidic reagent slowly and with stirring to alkali-preserved latex until said latex has a pH value of about 8.5 to 9.5, and then adding an alkali to increase its stability.

5. Steps which comprise adding slowly and with stirring a 2% to 10% solution of an acidic reagent to alkali-preserved latex until its alkalinity has been reduced to a point somewhat above the point of neutrality, and then adding an alkali in amount sufficient to restore its original alkalinity.

6. Steps which comprise treating alkali-preserved latex with an acidic reagent to effect a reaction upon free alkali and then upon other constituents in the latex, and finally terminating such treatment when reduction in alkalinity proceeds as theoretically expected from the reaction of said acidic reagent with the alkali alone.

7. An uncoagulated, alkali-preserved latex particularly suitable for impregnation purposes, which has been brought by an acid reagent to a pH value of about 8.5 to 9.5 from a region of much higher alkalinity.

8. An uncoagulated, alkali-preserved latex which has been partly neutralized with acidic reagent and then treated with alkali.

9. An uncoagulated, alkali-preserved latex which has been neutralized with acidic reagent to a pH value of about 8.5 to 9.5 and then treated with alkali to its original alkalinity.

10. An uncoagulated, alkali-preserved latex to which has been added sequentially an acid substance and an alkaline substance.

11. Steps which comprise adding an acid substance to an alkali-preserved latex while maintaining such latex in a substantially uncoagulated condition, and then adding an alkaline substance thereto.

12. A step which comprises adding an acid substance slowly and with stirring to alkali-preserved latex until a pH value of about 8.5 to 9.5 is reached.

13. A step which comprises adding a non-volatile acid to alkali-preserved latex until said latex has a pH value of about 8.5 to 9.5.

14. A step which comprises adding slowly and with stirring a 2% to 10% solution of a non-volatile acid to alkali-preserved latex until such latex has a pH value of about 8.5 to 9.5.

In testimony whereof we have affixed our signatures.

FREDERICK W. VOGEL.
PAUL BROWN.
ROGER B. HILL.